United States Patent
Nedungadi et al.

(10) Patent No.: US 12,289,290 B2
(45) Date of Patent: Apr. 29, 2025

(54) METHODS AND SYSTEMS FOR COMMUNICATIONS

(71) Applicant: Nile Global, Inc., San Jose, CA (US)

(72) Inventors: Promode Nedungadi, San Jose, CA (US); Avoy Nanda, Dublin, CA (US); Venu Hemige, San Ramon, CA (US); Steve Alexander, Dublin, CA (US); Suresh Katukam, Milpitas, CA (US)

(73) Assignee: Nile Global, Inc., San Jose, CA (US)

( * ) Notice: Subject to any disclaimer, the term of this patent is extended or adjusted under 35 U.S.C. 154(b) by 98 days.

(21) Appl. No.: 17/697,849

(22) Filed: Mar. 17, 2022

(65) Prior Publication Data

US 2023/0300108 A1 Sep. 21, 2023

(51) Int. Cl.
*G06F 15/16* (2006.01)
*H04L 12/66* (2006.01)
*H04L 61/103* (2022.01)
*H04L 61/4541* (2022.01)
*H04L 61/5014* (2022.01)

(52) U.S. Cl.
CPC .......... *H04L 61/5014* (2022.05); *H04L 12/66* (2013.01); *H04L 61/103* (2013.01); *H04L 61/4541* (2022.05)

(58) Field of Classification Search
CPC . H04L 61/5014; H04L 61/4541; H04L 12/66; H04L 61/103
USPC ................................................ 709/203, 245
See application file for complete search history.

(56) References Cited

U.S. PATENT DOCUMENTS

| | | | |
|---|---|---|---|
| 9,118,687 B2 | 8/2015 | Murphy et al. | |
| 9,408,177 B2 | 8/2016 | Koodli | |
| 10,693,832 B1* | 6/2020 | Wenig | H04L 12/4633 |
| 2006/0200543 A1* | 9/2006 | Kong | H04L 12/66 709/223 |
| 2010/0172293 A1* | 7/2010 | Toth | H04W 8/087 370/328 |
| 2013/0097294 A1* | 4/2013 | Deng | H04L 61/5014 709/221 |
| 2013/0272304 A1* | 10/2013 | Kamble | H04L 45/745 370/392 |
| 2016/0226768 A1* | 8/2016 | Liu | H04L 45/742 |
| 2020/0162517 A1* | 5/2020 | Wong | H04L 63/0236 |
| 2021/0091975 A1* | 3/2021 | Chen | H04L 41/0806 |
| 2021/0184930 A1 | 6/2021 | Mutnuru et al. | |

* cited by examiner

*Primary Examiner* — Duyen M Doan
(74) *Attorney, Agent, or Firm* — Loza & Loza, LLP

(57) ABSTRACT

Embodiments of a device and method are disclosed. In an embodiment, a method for communications involves establishing a tunnel connection between a switch of a network and a gateway of the network and in response to a communications device connecting to a network port of the switch, conducting data traffic involving the communications device through the tunnel connection between the switch and the gateway.

12 Claims, 12 Drawing Sheets

METHODS AND SYSTEMS FOR COMMUNICATIONS

BACKGROUND

Growing adoption of networks, such as, enterprise campus networks allows enterprises to increase network coverage and functionality. For example, due to the dynamic nature of the business and campuses, switches, gateways, access points (APs), and/or client devices, such as, laptops, printers, servers, security cameras, and/or other connected Internet of things (IoT) devices are typically interconnected in a network. However, communications between devices can be cumbersome and prone to security compromises because of various devices that can be present in a network. Therefore, there is a need for communications technology that can provide effective and safe communications between various devices in a network.

SUMMARY

Embodiments of a device and method are disclosed. In an embodiment, a method for communications involves establishing a tunnel connection between a switch of a network and a gateway of the network and in response to a communications device connecting to a network port of the switch, conducting data traffic involving the communications device through the tunnel connection between the switch and the gateway. Other embodiments are also described.

In an embodiment, the method further includes exchanging heartbeat information over the tunnel connection between the switch and the gateway.

In an embodiment, in response to the communications device connecting to the network port of the switch, conducting data traffic involving the communications device through the tunnel connection includes in response to the communications device connecting to the network port of the switch, conducting data traffic between the communications device and the gateway through the tunnel connection between the switch and the gateway.

In an embodiment, the data traffic carries Dynamic Host Configuration Protocol (DHCP) information.

In an embodiment, in response to the communications device connecting to the network port of the switch, conducting data traffic involving the communications device through the tunnel connection includes at the switch, receiving a first DHCP message from the communications device, and forwarding the first DHCP message to the gateway through the tunnel connection between the switch and the gateway.

In an embodiment, the first DHCP message includes a DHCP discover message.

In an embodiment, the first DHCP message includes a DHCP request message.

In an embodiment, in response to the communications device connecting to the network port of the switch, conducting data traffic involving the communications device through the tunnel connection further includes at the switch, receiving a second DHCP message from the gateway in response to the first DHCP message and forwarding the second DHCP message to the communications device through the tunnel connection between the switch and the gateway.

In an embodiment, the method further includes performing DHCP configuration at the switch based on the second DHCP message.

In an embodiment, the second DHCP message includes a DHCP offer message.

In an embodiment, the second DHCP message includes a DHCP acknowledgement (ACK) message.

In an embodiment, the data traffic carries Address Resolution Protocol (ARP) information.

In an embodiment, in response to the communications device connecting to the network port of the switch, conducting data traffic involving the communications device through the tunnel connection includes at the switch, receiving an ARP request from the communications device and forwarding the ARP request to the gateway through the tunnel connection between the switch and the gateway.

In an embodiment, in response to the communications device connecting to the network port of the switch, conducting data traffic involving the communications device through the tunnel connection further includes at the switch, receiving an ARP response from the gateway in response to the ARP request and performing ARP configuration at the switch based on the ARP response.

In an embodiment, the switch includes an access switch (AS) of the network.

In an embodiment, the switch includes a distribution switch (DS) of the network.

In an embodiment, the communications device includes a wired communications device.

In an embodiment, a method for communications involves at a switch of a network, establishing a tunnel connection between the switch and a gateway of the network and in response to a communications device connecting to a network port of the switch, conducting DHCP and ARP traffic between the communications device and the gateway through the tunnel connection between the switch and the gateway.

In an embodiment, in response to the communications device connecting to the network port of the switch, conducting DHCP and ARP data traffic between the communications device and the gateway through the tunnel connection includes at the switch, receiving at least one DHCP or ARP message from the communications device and from the switch, forwarding the at least one DHCP or ARP message to the gateway through the tunnel connection between the switch and the gateway.

In an embodiment, a method for communications involves at an access switch (AS) or a distribution switch (DS) of a network, establishing a Generic Routing Encapsulation (GRE) tunnel connection between the AS or the DS and a gateway of the network, and in response to a wired device connecting to a network port of the AS or the DS, conducting DHC) and ARP traffic between the wired device and the gateway through the GRE tunnel connection between the AS or the DS and the gateway.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
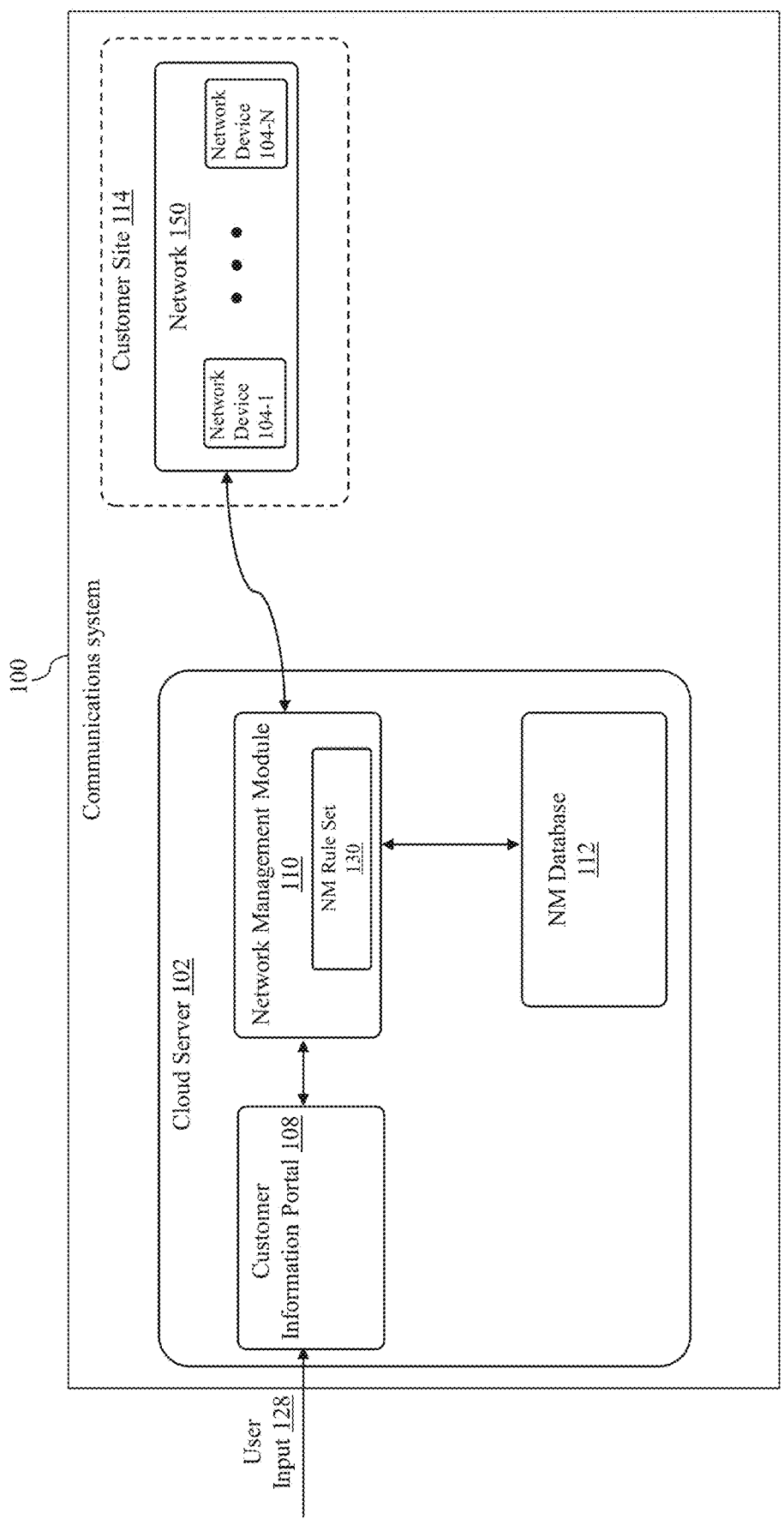
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and at least one deployed network 150 within a customer site 114. The cloud server and/or the deployed network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a network management service (e.g., a data communications service, such as, a data forwarding service) to network devices (e.g., the deployed network 150) at the customer site. Because the cloud server can facilitate or perform a network management service or operation for network devices at the customer site, network management efficiency can be improved. In addition, because the cloud server can facilitate or perform a network management service or operation for network devices at the customer site, a user or customer of the customer site can be notified of a device and/or network outage. Consequently, device and/or network outage time can be reduced. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a network management module (NMM) 110, a customer information portal 108 connected to the NMM 110, and a network management (NM) database 112 configured to store NM data. The NMM, the customer information portal, and/or the NM database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one NMM, more than one customer information portal, and/or more than one NM database. In another example, although the NMM, the customer information portal, and the NM database are shown in FIG. 1 as being connected in a certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the NMM 110 is configured to facilitate or perform a network management (NM) service (e.g., a data communications service, such as, a data forwarding service) to network devices (e.g., the deployed network 150) at the customer site 114, for example, using an NM rule set 130. The NM rule set 130 may include one or more NM rules (e.g., data communications rules, such as, data forwarding rules) for network devices at the customer site 114, for example, for performing an NM service (e.g., a data communications service, such as, a data forwarding service) to network devices at the customer site 114. In some embodiments, the NMM 110 is configured to generate and/or transmit at least one alert (e.g., a device outage alert, a network throughput alert, and/or a network security alert) regarding a network deployed and/or to be deployed at the customer site or a network operator site, for example, to an administrator or a user or customer (e.g., a layperson such as a worker on-site or an end-user such as an employee) at the customer site 114. In some embodiments, the NM database 112 is configured to store NM data (e.g., security data) for a network deployed and/or to be deployed at the customer site (e.g., a list of network devices deployed or to be deployed at the customer site). In some embodiments, the NM database 112 is configured to store the at least one NM alert. Because the NMM can facilitate or perform an NM service (e.g., a data communications service, such as, a data forwarding service) for network devices at the customer site, network operation efficiency can be improved. In addition, because the NMM can facilitate or perform a network service or operation for network devices at the customer site, an administrator or a customer can be notified of device and/or network conditions or outages. Consequently, device and/or network outage, low performance time, or a security breach period can be shortened. The customer information portal 108 is configured to receive user input 128. In some embodiments, the customer information portal is configured to include or generate a user interface that allows a customer to input information related to the customer site 114 (e.g., the floor plan of the customer site 114) and/or information associated with an NM service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the network devices 104-1, . . . , 104-N is compatible with Institute of Electrical and Electronics Engineers (IEEE) 802.3 protocol and/or one or more wireless local area network (WLAN) communications protocols, such as an IEEE 802.11 protocol, and/or a short-range communications protocol, such as Bluetooth. In some embodiments, at least one of the network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the network devices 104-1, . . . , 104-N is a wireless station (STA) that wirelessly connects to a wireless AP. For example, at least one of the network devices 104-1, . . . , 104-N may be a laptop, a desktop personal computer (PC), a mobile phone, or other wireless device that supports at least one WLAN communications protocol (e.g., an IEEE 802.11 protocol).

Figure 2:
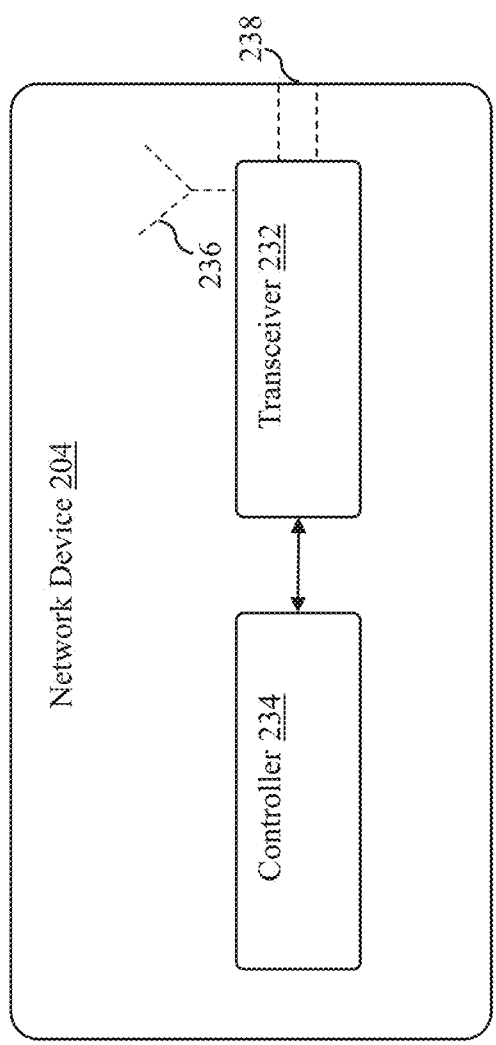
FIG. 2 depicts an embodiment of a network device of the communications system depicted in FIG. 1.

FIG. 2 depicts an embodiment of a network device 204 of the communications system 100 depicted in FIG. 1. The network device 204 may be an embodiment of a network device 104-1, ..., or 104-N that is included in the deployed network 150 in FIG. 1. However, network devices that can be included in the deployed network 150 depicted in FIG. 1 are not limited to the embodiment depicted in FIG. 2. The network device 204 may be any suitable type of network device. For example, the network device 204 may be a distribution switch (DS), a gateway or headend (HE), an access switch (AS), a wireless access point (AP), a sensor, a laptop, a desktop personal computer (PC), or a mobile phone. In the embodiment depicted in FIG. 2, the network device 204 includes at least one wireless and/or wired transceiver 232, at least one optional antenna 236 operably connected to the transceiver 232, at least one optional network port 238 operably connected to the transceiver 232, and a controller 234 operably connected to the transceiver 232. In some embodiments, the transceiver 232 includes a physical layer (PHY) device. The transceiver 232 may be any suitable type of transceiver. For example, the transceiver 232 may be an LAN transceiver (e.g., an Ethernet transceiver), a short-range communications transceiver (e.g., a Bluetooth or Bluetooth Low Energy (BLE) transceiver), or a WLAN transceiver (e.g., a transceiver compatible with an IEEE 802.11 protocol). In some embodiments, the network device 204 includes multiple transceivers, for example, an LAN transceiver (e.g., an Ethernet transceiver), a short-range communications transceiver (e.g., a Bluetooth or BLE transceiver), and/or a WLAN transceiver (e.g., a transceiver compatible with an IEEE 802.11 protocol). For example, the network device 204 includes a WLAN transceiver (e.g., a transceiver compatible with an IEEE 802.11 protocol) and a short-range communications transceiver (e.g., a Bluetooth or BLE transceiver). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to obtain and/or store information relevant to the network device 204 (e.g., security information relevant to the network device 204, such as, security certificate information). For example, the controller 234 may be configured to obtain and/or store security information relevant to the network device 204 such as security certificate information. In some embodiments, the controller 234 includes a storage device (e.g., one or more hard disks, flash memory modules, solid state disks, and/or optical disks) that contains or stores predefined information (e.g., a predefined security certificate), which may be placed or embedded into the network device during a manufacturing process. In some embodiments, the controller 234 is implemented using at least one processor (e.g., a microcontroller, a DSP, and/or a CPU). In some embodiments, the controller 234 executes one or more Layer 3 or L3 (i.e., the network layer, which is the third level (Layer 3) of the Open Systems Interconnection Model (OSI Model)) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. The controller 234 may include a processor (e.g., a microcontroller, a DSP, and/or a CPU) configured to execute one or more Layer 3 (L3) protocols, and memory that may store information (e.g., an operation system (OS)) for the processor. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a wired communications device that includes at least one wired transceiver (e.g., the transceiver 232) and at least one network port (e.g., the network port 238) that is used to connect to another communication device through at least one cable or wire, for example, at least one Ethernet cable. In some embodiments, as a wired device, the network device 204 includes a wireless transceiver and at least one antenna (e.g., the antenna 236).

Figure 3:
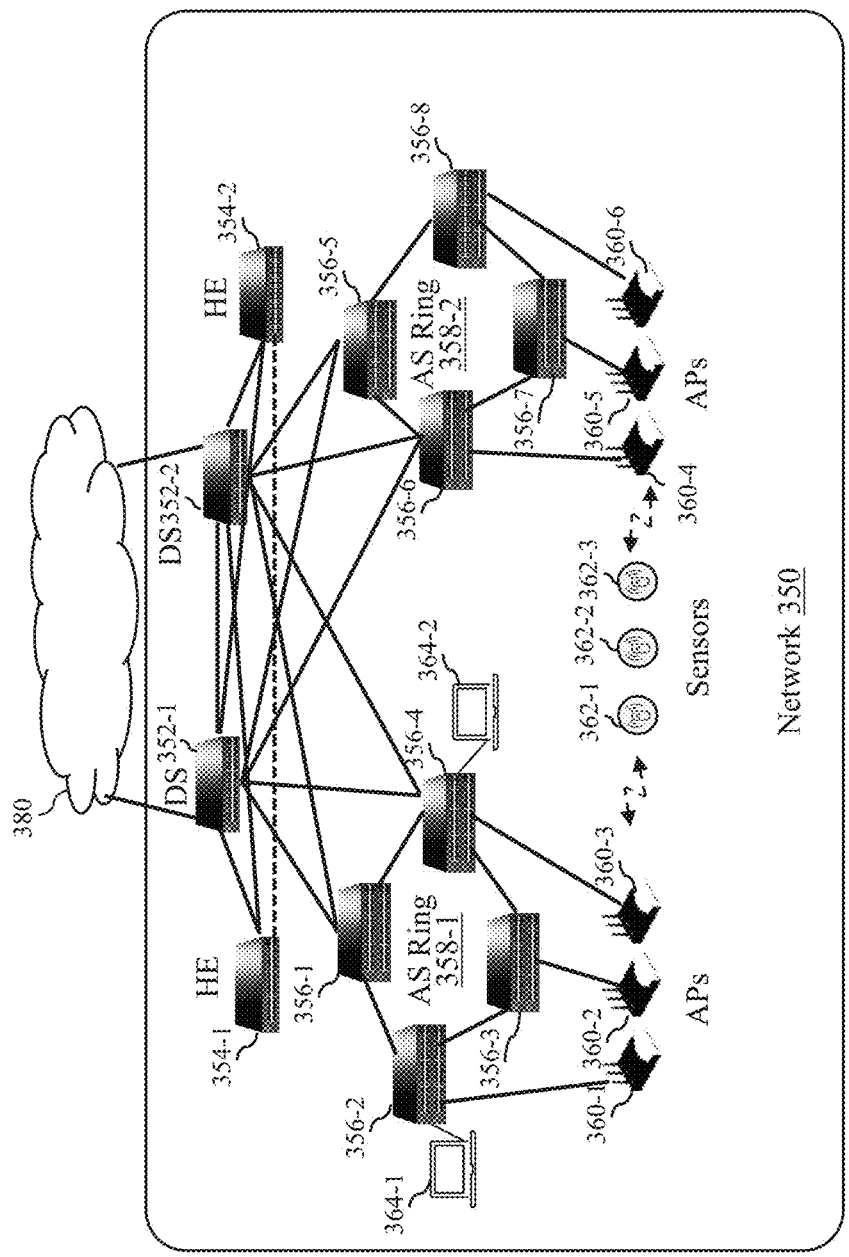
FIG. 3 depicts a network that can be included in the communications system depicted in FIG. 1.

FIG. 3 depicts a network 350 that can be included in the communications system 100 depicted in FIG. 1. The network 350 depicted in FIG. 3 is an embodiment of the network 150 depicted in FIG. 1. However, the network 150 depicted in FIG. 1 is not limited to the embodiment depicted in FIG. 3. In the embodiment depicted in FIG. 3, the network 350 includes a pair of distribution switches (DSs) or distribution layer switches 352-1, 352-2 that are aggregation switches functioning as a bridge between core layer switches and access layer switches, a pair of head ends (HEs) or gateways 354-1, 354-2, a number of access switches (ASs) 356-1, 356-2, 356-3, 356-4, 356-5, 356-6, 356-7, 356-8 connected in rings 358-1, 358-2 that directly interact with lower level devices (e.g., wireless APs), optional wireless APs 360-1, 360-2, 360-3, 360-4, 360-5, 360-6 connected to the ASs, optional wireless sensors 362-1, 362-2, 362-3 that wirelessly connect to the wireless APs, and a number of wired communications devices 364-1, 364-2 that are connected to the ASs 356-2, 356-4 through cables or wires, for example, Ethernet cables. The DSs 352-1, 352-2, the HEs 354-1, 354-2, the ASs 356-1, 356-2, 356-3, 356-4, 356-5, 356-6, 356-7, 356-8, the wireless APs 360-1, 360-2, 360-3, 360-4, 360-5, 360-6, the wireless sensors 362-1, 362-2, 362-3, and/or the wired communications devices 364-1, 364-2 may be an embodiment of the network device 204 depicted in FIG. 2. The wired communications devices 364-1, 364-2 may be, for example, laptops, desktop PCs, or other wired devices. In some embodiments, each of the wired communications devices 364-1, 364-2 includes at least one wired transceiver (e.g., the transceiver 232) and at least one network port (e.g., the network port 238) that is used to connect to another communication device through at least one cable or wire, for example, at least one Ethernet cable. In some embodiments, as a wired device, each of the wired communications devices 364-1, 364-2 includes a wireless transceiver and at least one antenna (e.g., the antenna 236). In some embodiments, the network 350 also includes at least one wired communications device that is connected to the DS 352-1 or 352-2 through at least one cable or wire, for example, at least one Ethernet cable. In the embodiment depicted in FIG. 3, the DSs 352-1, 352-2 are connected to a network 380 (e.g., the Internet), which is connected to a network management module (e.g., the network management module (NMM) 110 of the cloud server 102 depicted in FIG. 1). In some embodiments, the DSs 352-1, 352-2, the HEs 354-1, 354-2, and the ASs 356-1, 356-2, 356-3, 356-4, 356-5, 356-6, 356-7, 356-8 constitute a network service block (NSB), which is a basic building block for providing connectivity as a service and is a replicable block that can be scaled (e.g., expanded) to meet any deployment. In some embodiments, the NSB works in Layer 3 or L3 (i.e., the network layer, which is the third level (Layer 3) of the OSI Model) environment and is connected to other wired devices under L3 mode. A wired client (WC) (i.e., a wired communications device) of a customer (e.g., the wired communications device 364-1 or 364-2) can connect to the NSB on an L3 interface in a secured manner. When a wired client (WC) is connected to the NSB under L2 mode, broadcast or multicast traffic is not filtered, and data traffic is flooded to gateways (e.g., the HEs 354-1, 354-2) of the NSB, which can cause network outage. When a wired client (WC) is connected to the NSB under L3 mode, broadcast or multicast traffic is filtered, data traffic flooding to gateways (e.g., the HEs 354-1, 354-2) of the NSB can be avoided, and network outage can be reduced. Although the network 350 is shown with certain components and described with certain functionality herein, other embodiments of the network 350 may include fewer or more components to implement the same, less, or more functionality. For example, in some embodiments, the network 350 includes only one DS, more than two DSs, no HE, only one HE, more than two HEs, less than eight ASs, more than eight ASs, less than six wireless APs, more than six wireless APs, less than three wireless sensors, more than three wireless sensors, more than two wired communications devices, and/or less than two wired communications devices. Although each of the rings 358-1, 358-2 includes four ASs in the embodiment depicted in FIG. 3, in other embodiments, the number of ASs in each of the rings 358-1, 358-2 may be more than four or less than four. In another example, although the network 350 shown in FIG. 3 as being connected in certain topology, the network topology of the network 350 is not limited to the topology shown in FIG. 3. In some embodiments, the number of HEs and DSs is constant in the network 350 while the number of the wireless APs, the ASs, the sensor(s), and the wired communications devices in the network 350 varies.

Figure 4:
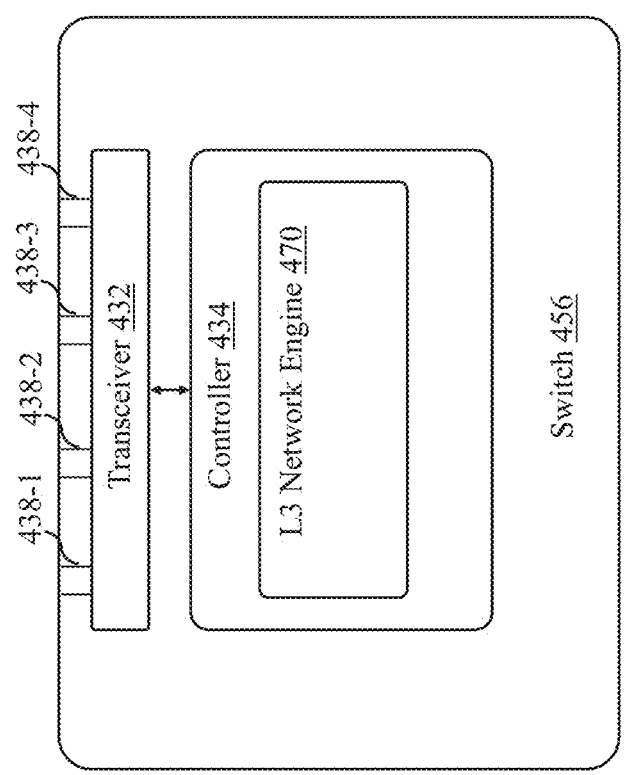
FIG. 4 depicts an embodiment of a switch that can be included in the network depicted in FIG. 3.

FIG. 4 depicts an embodiment of a switch 456 that can be included in the network 350 depicted in FIG. 3. The switch 456 may be an embodiment of the DSs 352-1, 352-2 and the ASs 356-1, 356-2, 356-3, 356-4, 356-5, 356-6, 356-7, 356-8 of the network 350 depicted in FIG. 3. However, the DSs 352-1, 352-2 and the ASs 356-1, 356-2, 356-3, 356-4, 356-5, 356-6, 356-7, 356-8 of the network 350 depicted in FIG. 3 are not limited to the embodiment depicted in FIG. 4. In the embodiment depicted in FIG. 4, the switch 456 includes at least one wireless and/or wired transceiver 432, four network ports 438-1, 438-2, 438-3, 438-4 operably connected to the transceiver 432, and a controller 434 operably connected to the transceiver 432. In some embodiments, the transceiver 432 includes a physical layer (PHY) device. The transceiver 432 may be any suitable type of transceiver. For example, the transceiver 432 may be a LAN (e.g., Ethernet) transceiver. In some embodiments, the switch 456 includes multiple transceivers. The network ports 438-1, 438-2, 438-3, 438-4 may be any suitable type of ports. For example, the network ports 438-1, 438-2, 438-3, 438-4 may be LAN network ports such as Ethernet ports. However, the network ports 438-1, 438-2, 438-3, 438-4 are not limited to LAN network ports. The network ports 438-1, 438-2, 438-3, 438-4 can be used to connect the switch to corresponding network ports of peer ASs or DSs, one or more wireless APs, and/or one or more wired communications devices. For example, the network ports 438-1, 438-2 are connected to network ports of peer ASs, while the network ports 438-3, 438-4 are connected to a wireless AP and a wired communications device (e.g., a laptop computer or a desktop computer), two wireless APs, or two wired communications devices. In some embodiments, the switch 456 includes different number of network ports. In the embodiment depicted in FIG. 4, the switch works in Layer 3 or L3 (i.e., the network layer, which is the third level (Layer 3) of the OSI Model) environment and is connected to other wired devices under L3 mode. A wired client (WC) of a customer (e.g., the wired communications device 364-1 or 364-2) can connect to the switch 456 on an L3 interface in a secured manner. When a wired client (WC) (i.e., a wired communications device) is connected to the switch 456 under L3 mode, broadcast or multicast traffic is filtered, data traffic flooding to gateways (e.g., the HEs 354-1, 354-2) of a network can be avoided, and network outage can be reduced. In some embodiments, the switch 456 includes one or more antennas. In some embodiments, the controller 434 is configured to control the transceiver 432 to process packets received through the network ports 438-1, 438-2, 438-3, 438-4 and/or to generate outgoing packets to be transmitted through the network ports 438-1, 438-2, 438-3, 438-4. In some embodiments, the controller 434 is configured to obtain and/or store communications and/or security information relevant to the switch 456. In some embodiments, the controller 434 executes one or more Layer 3 (L3) protocols, for example, an Internal Gateway Protocol (IGP) (e.g., an OSPF) \ protocol), a Border Gateway Protocol (BGP), or an Intermediate System to Intermediate System (IS-IS) protocol. The controller 434 may include a processor (e.g., a microcontroller, a DSP, and/or a CPU) configured to execute one or more Layer 3 (L3) protocols, and memory that may store information (e.g., an OS) for the processor.

In the embodiment depicted in FIG. 4, the switch 456 includes a Layer 3 (L3) network engine 470 configured to execute one or more Layer 3 (L3) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. In some embodiments, the L3 network engine 470 includes or is implemented using a processor (e.g., a microcontroller, a DSP, and/or a CPU) configured to execute one or more Layer 3 (L3) protocols, and memory that may store information (e.g., an OS) for the processor. For example, the controller 434 is implemented using a processor and memory, and the L3 network engine 470 is a software module that executes in the processor. In some embodiments, the controller 434 (e.g., the L3 network engine 470) includes a storage device (e.g., one or more hard disks, flash memory modules, solid state disks, and/or optical disks) that contains or stores predefined information (e.g., a predefined security certificate), which may be placed or embedded into the switch 456 during a manufacturing process. In some embodiments, when the switch 456 starts up, the switch 456 (e.g., the transceiver 432 and/or controller 434) connects, through one or more network ports 438-1, 438-2, 438-3, 438-4, one or more wired devices (e.g., the wired communications devices 364-1, 364-2) and/or one or more wireless APs (e.g., the wireless APs 360-1, 360-2, 360-3, 360-4, 360-5, 360-6) to a network (e.g., the network 350). In some embodiments, when a device (e.g., the wired communications device 364-1 or 364-2 or the wireless AP 360-1, 360-2, 360-3, 360-4, 360-5, or 360-6) is connected to the network port 438-1, 438-2, 438-3, or 438-4 of the switch 456, the switch 456 (e.g., the transceiver 432 and/or the controller 434) forwards data traffic from the device to a corresponding gateway (e.g., the HE 354-1 or 354-2) through a tunnel connection between the switch and the corresponding gateway and forwards data traffic from the corresponding gateway to the device through the tunnel connection between the switch and the corresponding gateway.

In some embodiment, the switch 456 is configured to establish a tunnel connection with a gateway of a network and in response to a communications device connecting to a network port of the switch, conduct data traffic involving the communications device through the tunnel connection between the switch and the gateway. By tunneling data traffic involving a communications device connected to the switch through the tunnel connection between the switch and a gateway, L3 data communications involving a communications device can be securely tunneled to the gateway. Consequently, broadcast or multicast traffic is filtered or reduced, data traffic flooding to the gateway can be avoided, and network outage can be reduced. The switch 456 can exchange heartbeat information over the tunnel connection with the gateway to maintain the health of the tunnel connection. In some embodiments, for every wired communications device connected to the switch, the same tunnel connection between the switch and the gateway is used. The switch 456 may conduct data traffic between the communications device and the gateway through the tunnel connection between the switch and the gateway. In some embodiments, the data traffic carries Dynamic Host Configuration Protocol (DHCP) information. The switch 456 may receive a first DHCP message from the communications device and forward the first DHCP message to the gateway through the tunnel connection between the switch and the gateway. The first DHCP message may include a DHCP discover message or a DHCP request message. The switch 456 may receive a second DHCP message from the gateway in response to the first DHCP message and forward the second DHCP message to the communications device through the tunnel connection between the switch and the gateway. The second DHCP message includes a DHCP offer message or a DHCP acknowledgement (ACK) message. In some embodiments, the switch 456 performs DHCP configuration at the switch based on the second DHCP message. In some embodiments, the data traffic carries Address Resolution Protocol (ARP) information. The switch may receive an ARP request from the communications device and forward the ARP request to the gateway through the tunnel connection between the switch and the gateway. The switch may receive an ARP response from the gateway in response to the ARP request and perform ARP configuration at the switch based on the ARP response. The switch may be an access switch (AS) or a distribution switch (DS) (e.g., the DSs 352-1, 352-2 and the ASs 356-1, 356-2, 356-3, 356-4, 356-5, 356-6, 356-7, 356-8 of the network 350 depicted in FIG. 3). The communications device may be a wired communications device that may include at least one wired transceiver (e.g., the transceiver 232) and at least one network port (e.g., the network port 238) that is used to connect to another communication device through at least one cable or wire, for example, at least one Ethernet cable. In some embodiments, the wired communications device also includes a wireless transceiver and at least one antenna (e.g., the antenna 236).

Figure 5:
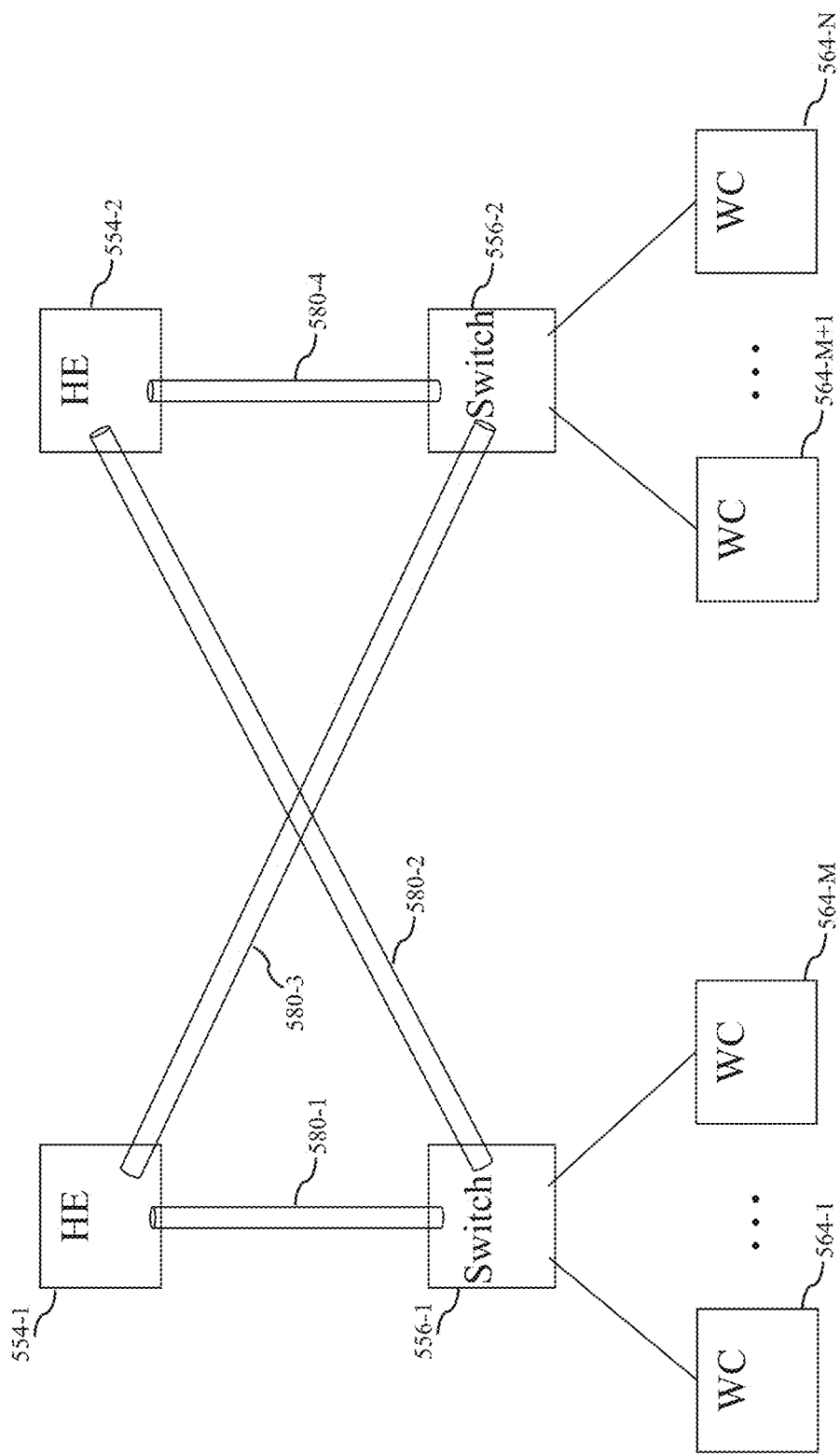
FIG. 5 depicts an overlay connectivity from switches to gateways to carry traffic from and to wired communications devices.

FIG. 5 depicts an overlay connectivity from switches (SWs) 556-1, 556-2 to HEs 554-1, 554-2 to carry traffic from and to wired communications devices (also referred to as wired clients (WCs)) 564-1, ..., 564-N, where N is an integer greater than one). In the embodiment depicted in FIG. 5, the switch 556-1 is connected to the wired communications devices 564-1, ..., 564-M (where M is an integer greater than zero but less than N) under L3 mode, while the switch 556-2 is connected to the wired communications devices 564-M+1, ..., 564-N under L3 mode. When a wired client (WC) is connected to the switches 556-1, 556-2 under L3 mode, broadcast or multicast traffic is filtered or reduced, data traffic flooding to the HEs 554-1, 554-2 can be avoided, and network outage can be reduced. In the embodiment depicted in FIG. 5, each switch 556-1 or 556-2 establishes a tunnel connection 580-1, 580-2, 580-3, or 580-4 (e.g., a Generic Routing Encapsulation (GRE) tunnel connection) with a corresponding HE 554-1 or 554-2. Specifically, the switch 556-1 establishes a tunnel connection 580-1 with the HE 554-1, the switch 556-1 establishes a tunnel connection 580-2 with the HE 554-2, the switch 556-2 establishes a tunnel connection 580-3 with the HE 554-1, and the switch 556-2 establishes a tunnel connection 580-4 with the HE 554-2. The switches 556-1, 556-2 may be embodiments of the switch 456 depicted in FIG. 4, the HEs 554-1, 554-2 may be embodiments of the HEs 354-1, 354-2 depicted in FIG. 3, and the wired communications devices 564-1, ..., 564-N may be embodiments of the wired communications devices 364-1, 364-2 depicted in FIG. 3. Each of the switches 556-1, 556 may be an AS (e.g., the AS 356-1, 356-2, 356-3, 356-4, 356-5, 356-6, 356-7, or 356-8 depicted in FIG. 3) or a DS (e.g., the DS 352-1 or 352-2 depicted in FIG. 3).

Figure 6:
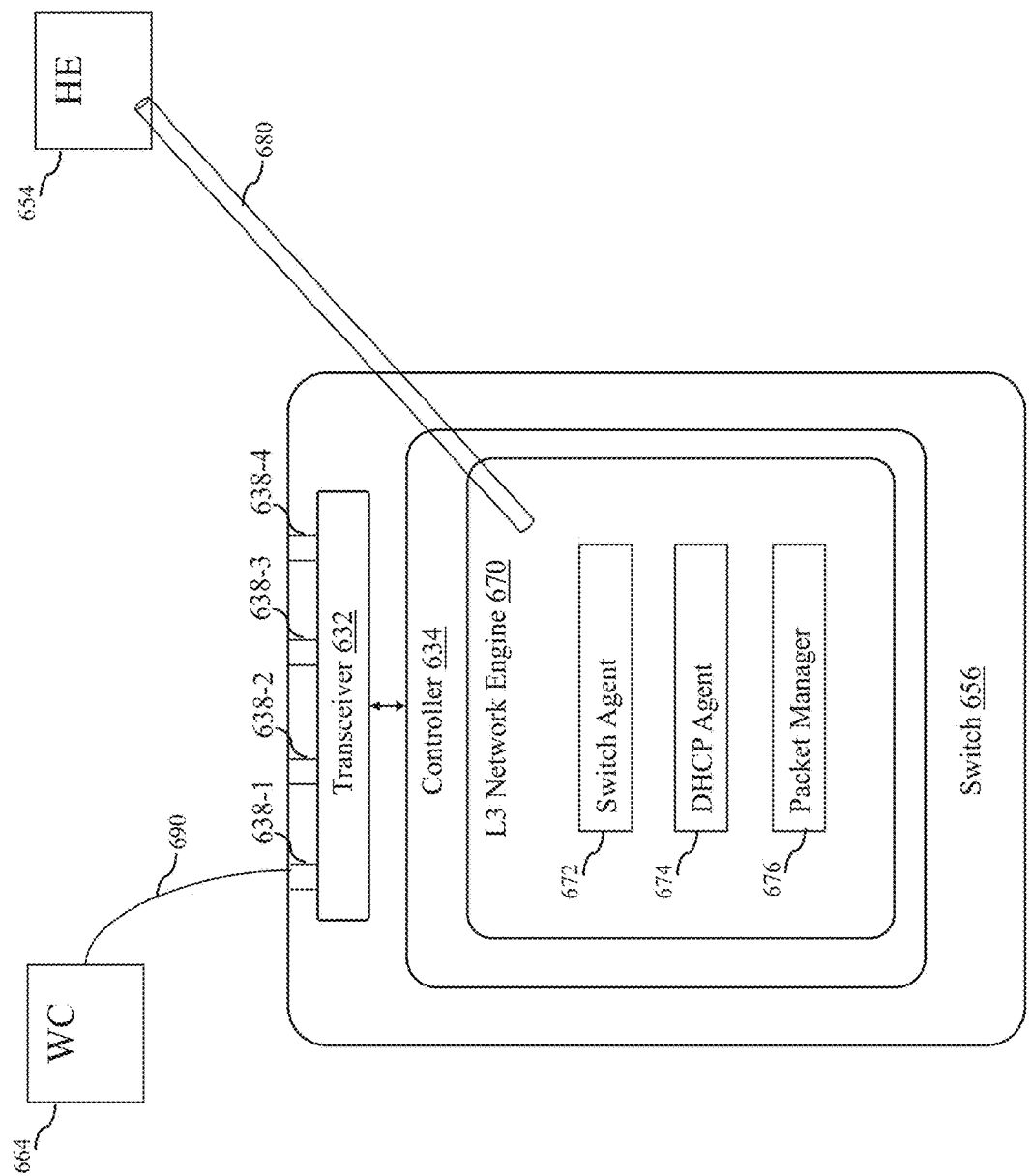
FIG. 6 depicts an overlay connectivity from a switch to a gateway to carry traffic from and to a wired communications device that is connected to a network port of the switch through a network cable.

FIG. 6 depicts an overlay connectivity from a switch 656 to an HE 654 to carry traffic from and to a wired client (WC) (i.e., a wired communications device) 664 that is connected to a network port 638-1 of the switch 656 through a network cable 690 (e.g., an Ethernet cable). In the embodiment depicted in FIG. 6, the switch 656 is connected to the wired communications device 664 under L3 mode. When a wired client (WC) (e.g., the wired communications device 664) is connected to the switch 656 under L3 mode, broadcast or multicast traffic is filtered or reduced, data traffic flooding to the HE 654 can be avoided, and network outage can be reduced. In the embodiment depicted in FIG. 6, the switch 656 establishes a tunnel connection 680 (e.g., a Generic Routing Encapsulation (GRE) tunnel connection) with the HE 654. The HE 654 may connect directly to the remaining ports 638-2, 638-3, or 638-4 of the switch 656 through a network cable or indirectly connected to the remaining ports 638-2, 638-3, or 638-4 of the switch 656 through another device (e.g., a DS). In some embodiments, for every wired communications device connected to the switch 656, the same tunnel connection 680 between the switch 656 and the HE 654 is used. The switch 656 may be an embodiment of the switch 456 depicted in FIG. 4 and/or the switches 556-1, 556-2 depicted in FIG. 5, the HE 654 may be an embodiment of the HEs 554-1, 554-2 depicted in FIG. 5 and/or the HEs 354-1, 354-2 depicted in FIG. 3, and the wired communications device 664 may be an embodiment of the wired communications devices 364-1, 364-2 depicted in FIG. 3 and/or the wired communications devices 564-1, ..., 564-N depicted in FIG. 5. The switch 656 may be an AS (e.g., the AS 356-1, 356-2, 356-3, 356-4, 356-5, 356-6, 356-7, or 356-8 depicted in FIG. 3) or a DS (e.g., the DS 352-1 or 352-2 depicted in FIG. 3).

In the embodiment depicted in FIG. 6, the switch 656 includes at least one wireless and/or wired transceiver 632, four network ports 638-1, 638-2, 638-3, 638-4 operably connected to the transceiver 632, and a controller 634 operably connected to the transceiver 632. In some embodiments, the transceiver 632 includes a physical layer (PHY) device. The transceiver 632 may be any suitable type of transceiver. For example, the transceiver 632 may be a LAN (e.g., Ethernet) transceiver. In some embodiments, the switch 656 includes multiple transceivers. The network ports 638-1, 638-2, 638-3, 638-4 may be any suitable type of ports. For example, the network ports 638-1, 638-2, 638-3, 638-4 may be LAN network ports such as Ethernet ports. However, the network ports 638-1, 638-2, 638-3, 638-4 are not limited to LAN network ports. The network ports 638-1, 638-2, 638-3, 638-4 can be used to connect the switch to corresponding network ports of peer ASs or DSs, one or more wireless APs, and/or one or more wired communications devices. In some embodiments, the switch 656 includes different number of network ports. The wired communications device 664 is connect to the switch 656 on an L3 interface in a secured manner. When the wired communications device 664 is connected to the switch 656 under L3 mode, broadcast or multicast traffic is filtered, data traffic flooding to the HE 654 can be avoided, and network outage can be reduced. In some embodiments, the switch 656 includes one or more antennas. In some embodiments, the controller 634 is configured to control the transceiver 632 to process packets received through the network ports 638-1, 638-2, 638-3, 638-4 and/or to generate outgoing packets to be transmitted through the network ports 638-1, 638-2, 638-3, 638-4. In some embodiments, the controller 634 is configured to obtain and/or store communications and/or security information relevant to the switch 656. In some embodiments, the controller 634 executes one or more Layer 3 (L3) protocols, for example, an IGP (e.g., an OSPF protocol), a BGP, or an IS-IS protocol. The controller 634 may include a processor (e.g., a microcontroller, a DSP, and/or a CPU) configured to execute one or more Layer 3 (L3) protocols, and memory that may store information (e.g., an OS) for the processor. In the embodiment depicted in FIG. 6, the switch 656 includes a Layer 3 (L3) network engine 670 configured to execute one or more Layer 3 (L3) protocols, for example, an IGP (e.g., an OSPF protocol), a BGP, or an IS-IS protocol. In some embodiments, the network engine 670 includes or is implemented using a processor (e.g., a microcontroller, a DSP, and/or a CPU) configured to execute one or more Layer 3 (L3) protocols, and memory that may store information (e.g., an OS) for the processor. For example, the controller 634 is implemented using a processor and memory, and the L3 network engine 470 is a software module that executes in the processor. In some embodiments, the controller 634 (e.g., the L3 network engine 670) includes a storage device (e.g., one or more hard disks, flash memory modules, solid state disks, and/or optical disks) that contains or stores predefined information (e.g., a predefined security certificate), which may be placed or embedded into the switch 656 during a manufacturing process. In the embodiment depicted in FIG. 6, the L3 network engine 670 includes a switch agent 672 configured to perform switching functions (e.g., configurating a forward plane to ensure network connectivity), a DHCP agent 674 configured to perform DHCP functions (e.g., DHCP client functions or server functions to help in getting Internet Protocol (IP) addresses allocated to WCs), and a packet manager 676 configured to perform packet management functions (e.g., routing functions using one or more L3 routing protocols). The switch agent 672, the DHCP agent 674, and/or the packet manager 676 may be implemented in hardware (e.g., circuits), software, firmware, or a combination thereof. For example, the controller 634 (e.g., the L3 network engine 670) is implemented using a processor and memory, and the switch agent 672, the DHCP agent 674, and/or the packet manager 676 are software modules that executes in the processor.

Figure 7:
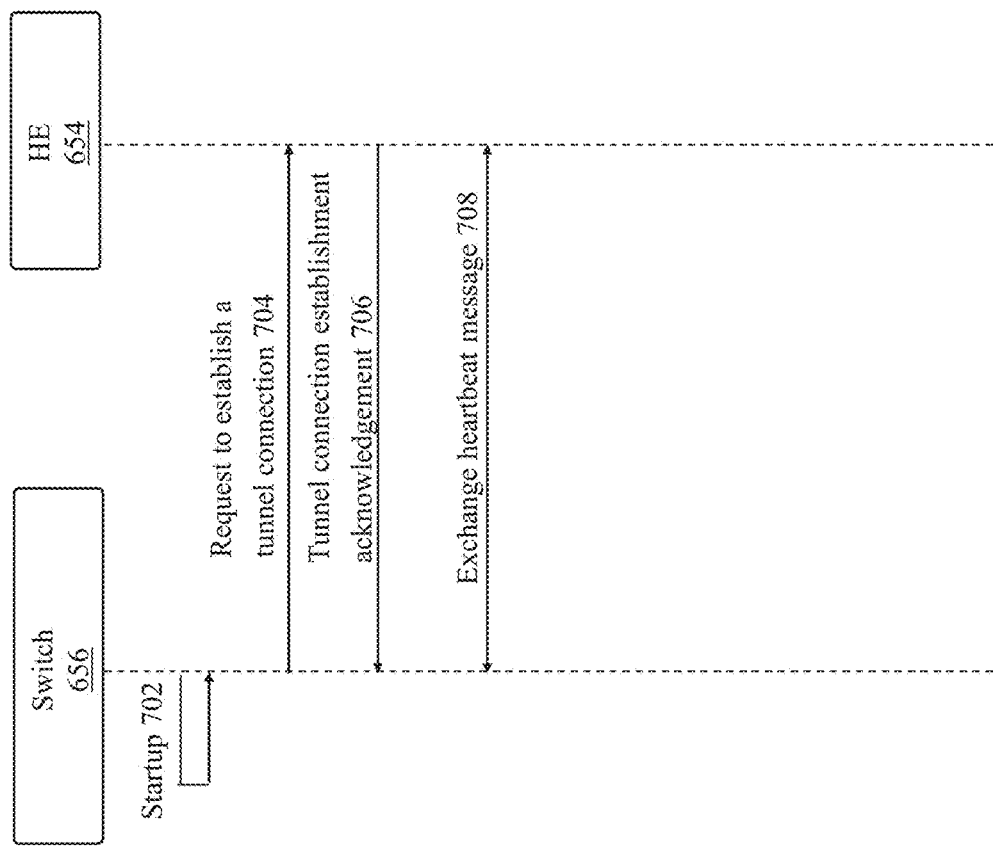
FIG. 7 shows a swim-lane diagram illustrating an example tunnel establishment procedure between the switch and the gateway depicted in FIG. 6.

FIG. 7 shows a swim-lane diagram illustrating an example tunnel establishment procedure between the switch 656 and the HE 654 depicted in FIG. 6. Although operations in the example procedure in FIG. 7 are described in a particular order, in some embodiments, the order of the operations in the example procedure may be altered so that certain operations may be performed in an inverse order or so that certain operations may be performed, at least in part, concurrently with other operations. In operation 702, the switch 656 starts or boots up. In operation 704, the switch 656 sends a request to establish a tunnel connection (e.g., a GRE tunnel) to the HE 654. In operation 706, the HE 654 sends a tunnel connection establishment acknowledgement to the switch 656. In operation 708, heartbeat messages are exchanged between the HE 654 and the switch 656 to maintain the health of the tunnel connection between the HE 654 and the switch 656.

Figure 8:
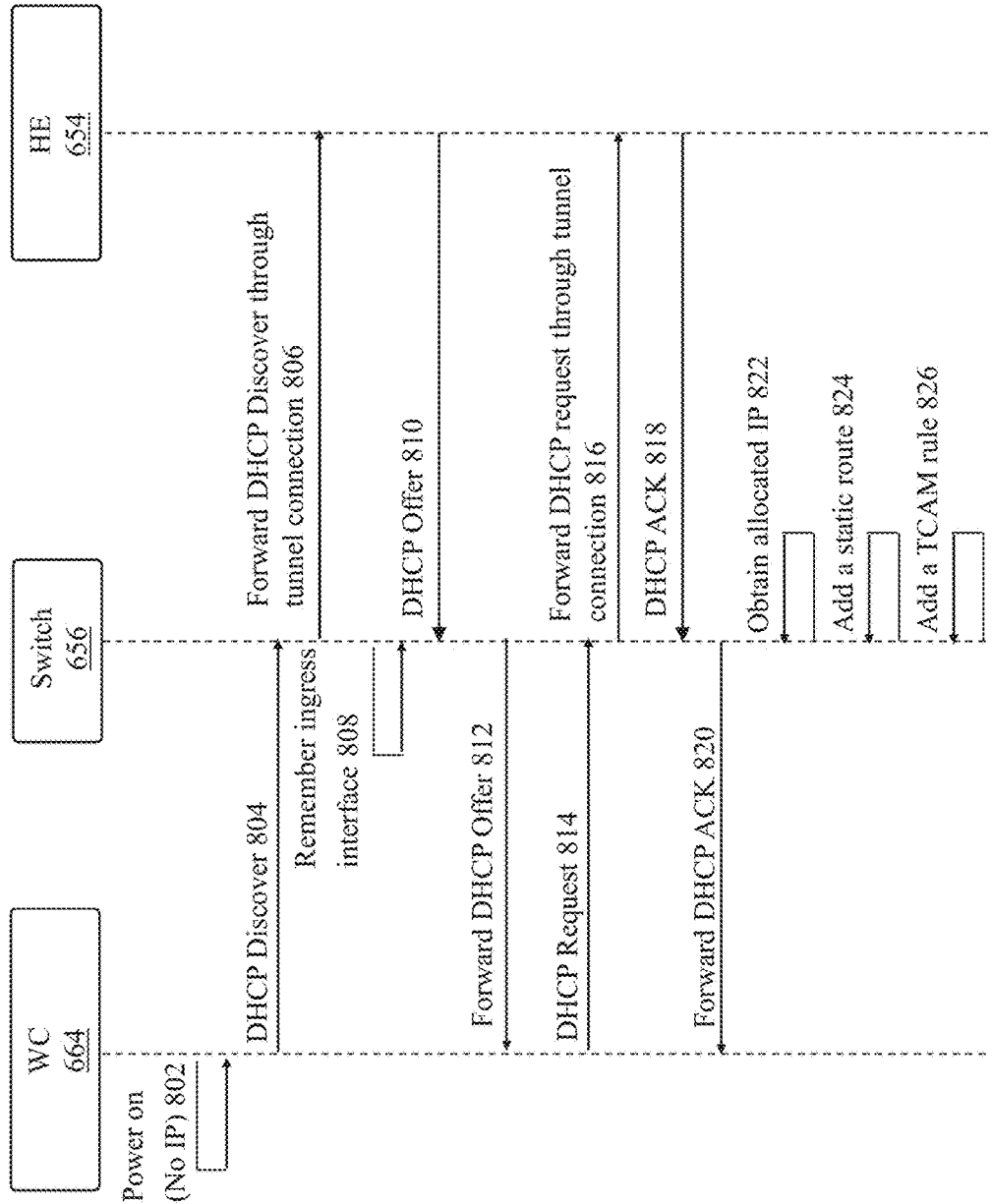
FIG. 8 shows a swim-lane diagram illustrating an example DHCP communications procedure between the wired communications device, the switch, and the HE depicted in FIG. 6.

FIG. 8 shows a swim-lane diagram illustrating an example DHCP communications procedure between the wired communications device (WC) 664, the switch 656, and the HE 654 depicted in FIG. 6. Although operations in the example procedure in FIG. 8 are described in a particular order, in some embodiments, the order of the operations in the example procedure may be altered so that certain operations may be performed in an inverse order or so that certain operations may be performed, at least in part, concurrently with other operations. In operation 802, the WC 664 powers or boots up. In operation 804, the WC 664 sends a DHCP discover message to the switch 656. In operation 806, the switch 656 forwards the DHCP discover message to the HE 654 through the tunnel connection 680. In operation 808, the switch remembers an ingress interface from which the DHCP discovery message is received from the WC 664. In operation 810, the HE 654 sends a DHCP offer message to the switch 656 through the tunnel connection 680. In operation 812, the switch 656 forwards the DHCP offer message to the WC 664, for example, through the ingress interface. In operation 814, the WC 664 sends a DHCP request message to the switch 656 through the tunnel connection 680. In operation 816, the switch 656 forwards the DHCP request message to the HE 654 through the tunnel connection 680. In operation 818, the HE 654 sends a DHCP acknowledgement (ACK) message to the switch 656 through the tunnel connection 680. In operation 820, the switch 656 forwards the DHCP ACK message to the WC 664 through the tunnel connection 680, for example, through the ingress interface. In operation 822, the switch 656 obtains an allocated IP address of the WC 664. In operation 824, the switch 656 adds a static route. In some embodiments, any DHCP or ARP traffic is forwarded to the WC 664. In some embodiments, DHCP and/or ARP packets are punted to a CPU such that the L3 network engine 670 (e.g., the packet manager 676) can add a static route (e.g., a static ARP route) in the forwarding plane. In operation 826, the switch 656 adds a ternary content-addressable memory (TCAM) rule to help punting DHCP and/or ARP packets, e.g., to forward traffic to the IP address of the WC 664 on the interface where the WC 664 is connected.

Figure 9:
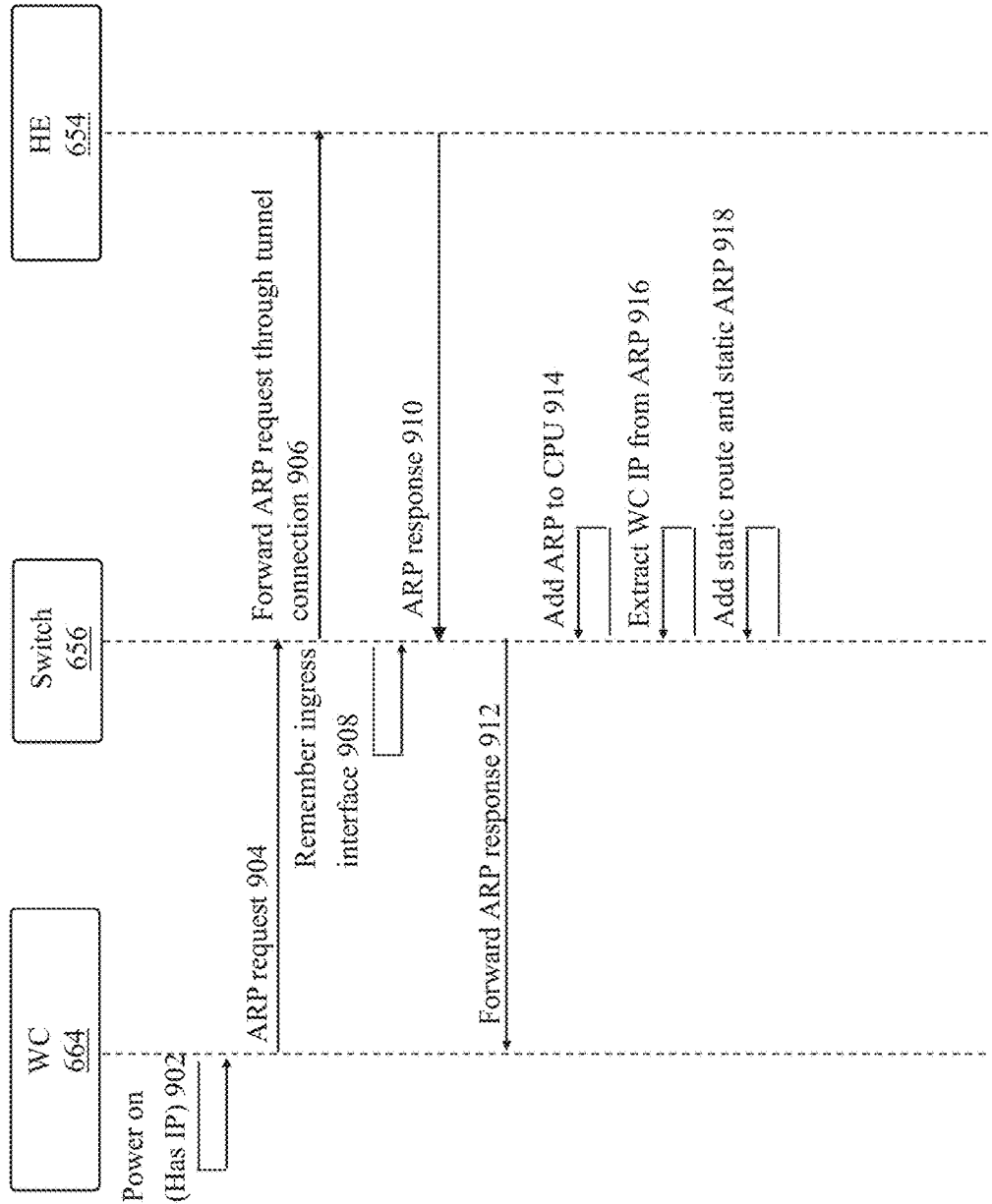
FIG. 9 shows a swim-lane diagram illustrating an example ARP communications procedure between the wired communications device, the switch, and the HE depicted in FIG. 6.

FIG. 9 shows a swim-lane diagram illustrating an example ARP communications procedure between the wired communications device (WC) 664, the switch 656, and the HE 654 depicted in FIG. 6. Although operations in the example procedure in FIG. 9 are described in a particular order, in some embodiments, the order of the operations in the example procedure may be altered so that certain operations may be performed in an inverse order or so that certain operations may be performed, at least in part, concurrently with other operations. In operation 902, the WC 664 powers or boots up. In operation 904, the WC 664 sends an ARP request message to the switch 656. In operation 906, the switch 656 forwards the ARP request message to the HE 654 through the tunnel connection 680. In operation 908, the switch remembers an ingress interface from which the ARP request message is received from the WC 664. In operation 910, the HE 654 sends an ARP response message to the switch 656 through the tunnel connection 680. In operation 912, the switch 656 forwards the ARP response message to the WC 664, for example, through the ingress interface from which the ARP request message is received. In operation 914, the switch 656 adds ARP information to a CPU as well as a forwarding plane. In operation 916, the switch 656 extracts the IP address of the WC 664 from the ARP response. In operation 918, the switch 656 adds a static route and static ARP information based on, for example, the ARP response. In some embodiments, DHCP and ARP packets are punted to a CPU such that the L3 network engine 670 (e.g., the packet manager 676) can add a static ARP route in the forwarding plane.

Figure 10:
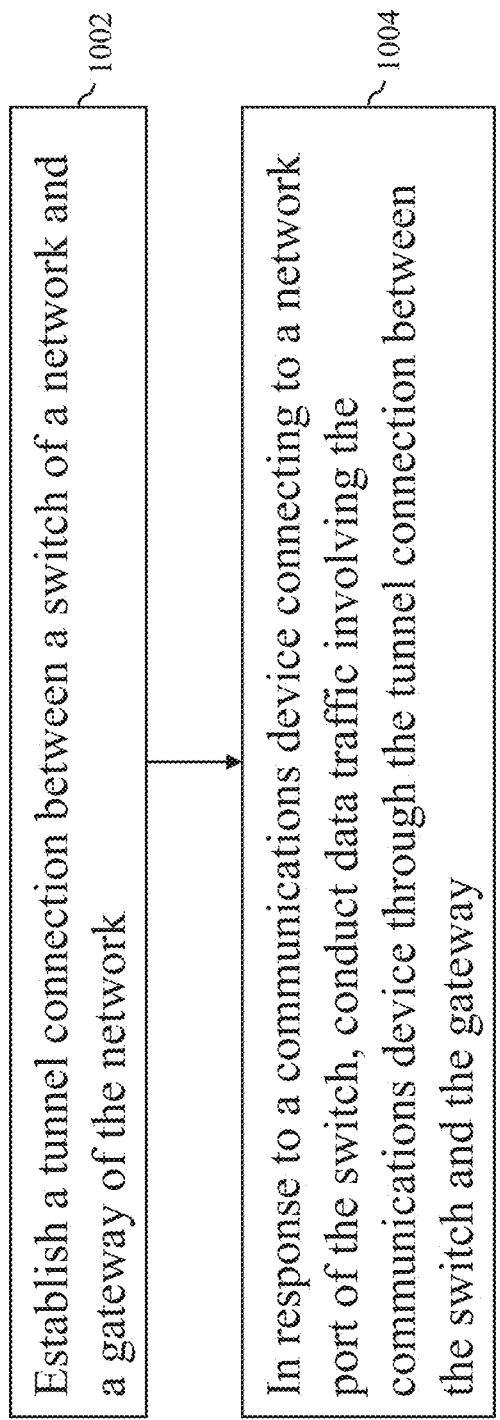
FIG. 10 is a process flow diagram of a method for communications in an enterprise campus network in accordance to an embodiment of the invention.

FIG. 10 is a process flow diagram of a method for communications in accordance to an embodiment of the invention. According to the method, at block 1002, a tunnel connection between a switch of a network and a gateway of the network is established. At block 1004, in response to a communications device connecting to a network port of the switch, data traffic involving the communications device is conducted through the tunnel connection between the switch and the gateway. In some embodiments, heartbeat information is exchanged over the tunnel connection between the switch and the gateway. In some embodiments, in response to the communications device connecting to the network port of the switch, data traffic between the communications device and the gateway is conducted through the tunnel connection between the switch and the gateway. In some embodiments, the data traffic carries Dynamic Host Configuration Protocol (DHCP) information. In some embodiments, at the switch, a first DHCP message is received from the communications device, and the first DHCP message is forwarded to the gateway through the tunnel connection between the switch and the gateway. In some embodiments, the first DHCP message includes a DHCP discover message. In some embodiments, the first DHCP message includes a DHCP request message. In some embodiments, at the switch, a second DHCP message from the gateway in response to the first DHCP message is received, and the second DHCP message is forwarded to the communications device through the tunnel connection between the switch and the gateway. In some embodiments, DHCP configuration is performed at the switch based on the second DHCP message. In some embodiments, the second DHCP message includes a DHCP offer message. In some embodiments, the second DHCP message includes a DHCP acknowledgement (ACK) message. In some embodiments, the data traffic carries Address Resolution Protocol (ARP) information. In some embodiments, at the switch, an ARP request is received from the communications device and the ARP request is forwarded to the gateway through the tunnel connection between the switch and the gateway. In some embodiments, at the switch, an ARP response is received from the gateway in response to the ARP request, and ARP configuration is performed at the switch based on the ARP response. In some embodiments, the switch includes an access switch (AS) of the network or a distribution switch (DS) of the network. In some embodiments, the communications device includes a wired communications device. The switch may be similar to, the same as, or a component of the ASs 356-1, 356-2, 356-3, 356-4, 356-5, 356-6, 356-7, 356-8 depicted in FIG. 3, the switch 456 depicted in FIG. 4, the switches 556-1, 556-2 depicted in FIG. 5, and/or the switch 656 depicted in FIGS. 6-9. The network port may be similar to, the same as, or a component of the network port 238 depicted in FIG. 2, the network ports 438-1, 438-2, 438-3, 438-4 depicted in FIG. 4, and/or the network ports 638-1, 638-2, 638-3, 638-4 depicted in FIG. 6. The communications device may be similar to, the same as, or a component of the wireless APs 360-1, 360-2, 360-3, 360-4, 360-5, 360-6 depicted in FIG. 3, the network devices 364-1, 364-2 depicted in FIG. 3, the wired communications devices 564-1, . . . , 564-N depicted in FIG. 5, and/or the wired communications device 664 depicted in FIGS. 6-9. The gateway may be similar to, the same as, or a component of the HE 354-1, 354-2 depicted in FIG. 3, the HE 554-1, 554-2 depicted in FIG. 5, and/or the HE 654 depicted in FIGS. 6-9. The network may be similar to, the same as, or a component of the network 150 depicted in FIG. 1 and/or the network 350 depicted in FIG. 3.

Figure 11:
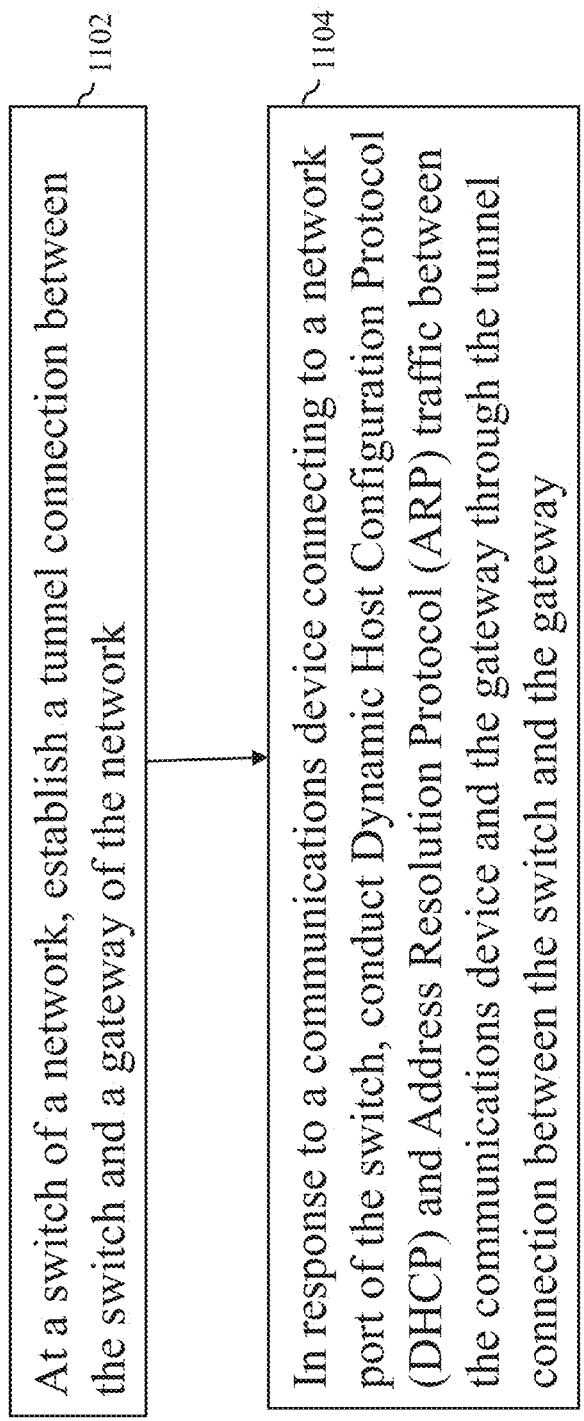
FIG. 11 is a process flow diagram of a method for communications in an enterprise campus network in accordance to an embodiment of the invention.

FIG. 11 is a process flow diagram of a method for communications in accordance to an embodiment of the invention. According to the method, at block 1102, at a switch of a network, a tunnel connection between the switch and a gateway of the network is established. At block 1104, in response to a communications device connecting to a network port of the switch, Dynamic Host Configuration Protocol (DHCP) and Address Resolution Protocol (ARP) traffic is conducted between the communications device and the gateway through the tunnel connection between the switch and the gateway. In some embodiments, at the switch, at least one DHCP or ARP message is received from the communications device, and from the switch, the at least one DHCP or ARP message is forwarded to the gateway through the tunnel connection between the switch and the gateway. The switch may be similar to, the same as, or a component of the ASs 356-1, 356-2, 356-3, 356-4, 356-5, 356-6, 356-7, 356-8 depicted in FIG. 3, the switch 456 depicted in FIG. 4, the switches 556-1, 556-2 depicted in FIG. 5, and/or the switch 656 depicted in FIGS. 6-9. The network port may be similar to, the same as, or a component of the network port 238 depicted in FIG. 2, the network ports 438-1, 438-2, 438-3, 438-4 depicted in FIG. 4, and/or the network ports 638-1, 638-2, 638-3, 638-4 depicted in FIG. 6. The communications device may be similar to, the same as, or a component of the wireless APs 360-1, 360-2, 360-3, 360-4, 360-5, 360-6 depicted in FIG. 3, the network devices 364-1, 364-2 depicted in FIG. 3, the wired communications devices 564-1, . . . , 564-N depicted in FIG. 5, and/or the wired communications device 664 depicted in FIGS. 6-9. The gateway may be similar to, the same as, or a component of the HE 354-1, 354-2 depicted in FIG. 3, the HE 554-1, 554-2 depicted in FIG. 5, and/or the HE 654 depicted in FIGS. 6-9. The network may be similar to, the same as, or a component of the network 150 depicted in FIG. 1 and/or the network 350 depicted in FIG. 3.

Figure 12:
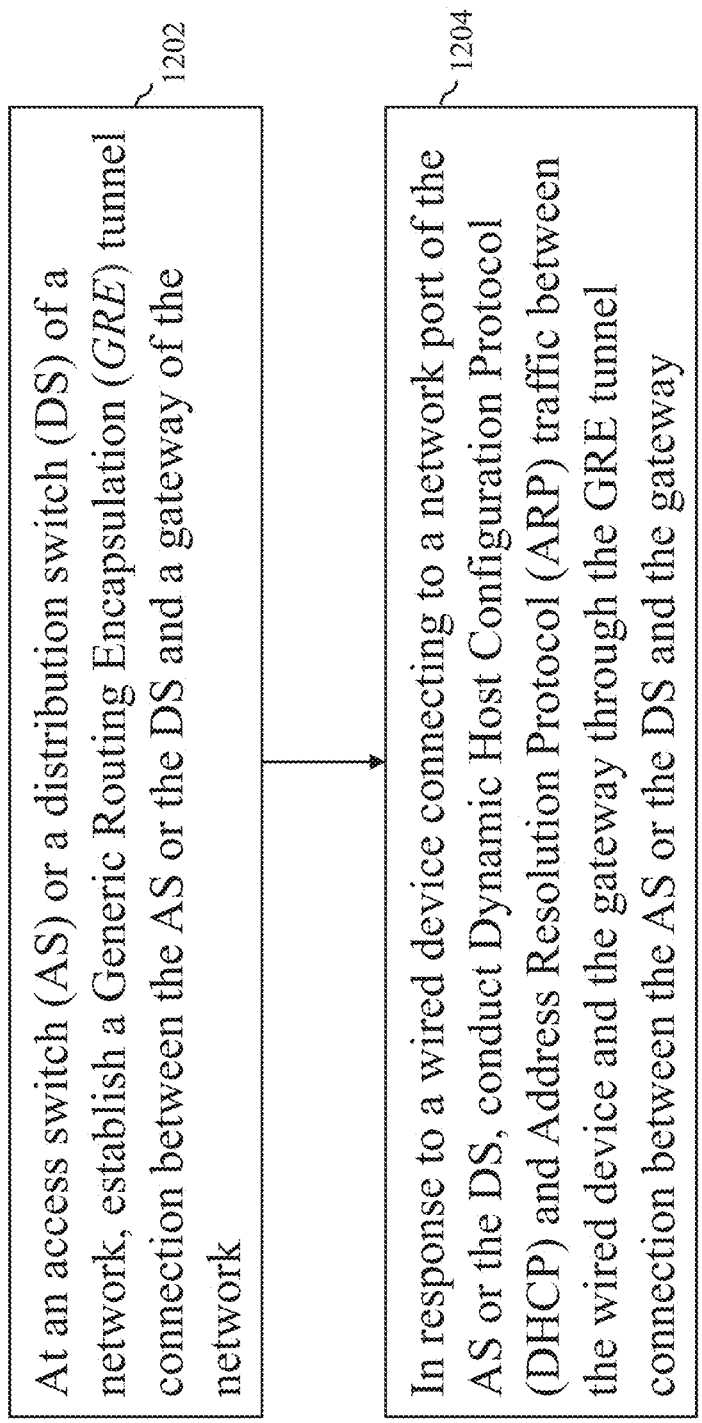
FIG. 12 is a process flow diagram of a method for communications in an enterprise campus network in accordance to an embodiment of the invention.

FIG. 12 is a process flow diagram of a method for communications in accordance to an embodiment of the invention. According to the method, at block 1202, at an access switch (AS) or a distribution switch (DS) of a network, a Generic Routing Encapsulation (GRE) tunnel connection between the AS or the DS and a gateway of the network is established. At block 1204, in response to a wired device connecting to a network port of the AS or the DS, Dynamic Host Configuration Protocol (DHCP) and Address Resolution Protocol (ARP) traffic between the wired device and the gateway is conducted through the GRE tunnel connection between the AS or the DS and the gateway. The AS or the DS may be similar to, the same as, or a component of the ASs 356-1, 356-2, 356-3, 356-4, 356-5, 356-6, 356-7, 356-8 depicted in FIG. 3, the switch 456 depicted in FIG. 4, the switches 556-1, 556-2 depicted in FIG. 5, and/or the switch 656 depicted in FIGS. 6-9. The network port may be similar to, the same as, or a component of the network port 238 depicted in FIG. 2, the network ports 438-1, 438-2, 438-3, 438-4 depicted in FIG. 4, and/or the network ports 638-1, 638-2, 638-3, 638-4 depicted in FIG. 6. The communications device may be similar to, the same as, or a component of the wireless APs 360-1, 360-2, 360-3, 360-4, 360-5, 360-6 depicted in FIG. 3, the network devices 364-1, 364-2 depicted in FIG. 3, the wired communications devices 564-1, . . . , 564-N depicted in FIG. 5, and/or the wired communications device 664 depicted in FIGS. 6-9. The gateway may be similar to, the same as, or a component of the HE 354-1, 354-2 depicted in FIG. 3, the HE 554-1, 554-2 depicted in FIG. 5, and/or the HE 654 depicted in FIGS. 6-9. The network may be similar to, the same as, or a component of the network 150 depicted in FIG. 1 and/or the network 350 depicted in FIG. 3.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for communications, the method comprising:
   establishing a tunnel connection between a switch of a network and a gateway of the network; and
   in response to a communications device connecting to a network port of the switch, conducting data traffic involving the communications device through the tunnel connection between the switch and the gateway, wherein in response to the communications device connecting to the network port of the switch, conducting data traffic involving the communications device through the tunnel connection comprises:
      at the switch, receiving a Dynamic Host Configuration Protocol (DHCP) discover message from the communications device;
      forwarding the DHCP discover message to the gateway through the tunnel connection between the switch and the gateway;
      at the switch, receiving a DHCP offer message from the gateway in response to the DHCP discover message;
      at the switch, forwarding the DHCP offer message to the communications device;
      at the switch, receiving a DHCP request message from the communications device;
      forwarding the DHCP request message to the gateway through the tunnel connection between the switch and the gateway;
      at the switch, receiving a DHCP acknowledgement (ACK) message from the gateway in response to the DHCP request message;
      at the switch, forwarding the DHCP ACK message to the communications device;
      at the switch, adding Address Resolution Protocol (ARP) information to a central processing unit (CPU) as well as a forwarding plane;
      at the switch, obtaining an allocated IP address of the communications device from a response from the gateway;
      at the switch, adding a static ARP route in the forwarding plane; and
      at the switch, adding a ternary content-addressable memory (TCAM) rule to forward traffic to the allocated IP address of the communications device.

2. The method of claim 1, further comprising exchanging heartbeat information over the tunnel connection between the switch and the gateway.

3. The method of claim 1, wherein in response to the communications device connecting to the network port of the switch, conducting data traffic involving the communications device through the tunnel connection comprises in response to the communications device connecting to the network port of the switch, conducting data traffic between the communications device and the gateway through the tunnel connection between the switch and the gateway.

4. The method of claim 1, wherein the data traffic carries Address Resolution Protocol (ARP) information.

5. The method of claim 1, wherein in response to the communications device connecting to the network port of the switch, conducting data traffic involving the communications device through the tunnel connection comprises:
   at the switch, receiving an Address Resolution Protocol (ARP) request from the communications device; and
   forwarding the ARP request to the gateway through the tunnel connection between the switch and the gateway.

6. The method of claim 5, wherein in response to the communications device connecting to the network port of the switch, conducting data traffic involving the communications device through the tunnel connection further comprises:
   at the switch, receiving an ARP response from the gateway in response to the ARP request; and performing ARP configuration at the switch based on the ARP response.

7. The method of claim 1, wherein the switch comprises an access switch (AS) of the network.

8. The method of claim 1, wherein the switch comprises a distribution switch (DS) of the network.

9. The method of claim 1, wherein the communications device comprises a wired communications device.

10. A method for communications, the method comprising:
- at a switch of a network, establishing a tunnel connection between the switch and a gateway of the network; and
- in response to a communications device connecting to a network port of the switch, conducting Dynamic Host Configuration Protocol (DHCP) and Address Resolution Protocol (ARP) traffic between the communications device and the gateway through the tunnel connection between the switch and the gateway, wherein in response to the communications device connecting to the network port of the switch, conducting the DHCP and ARP traffic between the communications device and the gateway through the tunnel connection between the switch and the gateway comprises:
  - at the switch, receiving a DHCP discover message from the communications device;
  - forwarding the DHCP discover message to the gateway through the tunnel connection between the switch and the gateway;
  - at the switch, receiving a DHCP offer message from the gateway in response to the DHCP discover message;
  - at the switch, forwarding the DHCP offer message to the communications device;
  - at the switch, receiving a DHCP request message from the communications device;
  - forwarding the DHCP request message to the gateway through the tunnel connection between the switch and the gateway;
  - at the switch, receiving a DHCP acknowledgement (ACK) message from the gateway in response to the DHCP request message;
  - at the switch, forwarding the DHCP ACK message to the communications device;
  - at the switch, adding ARP information to a central processing unit (CPU) as well as a forwarding plane;
  - at the switch, obtaining an allocated IP address of the communications device from a response from the gateway;
  - at the switch, adding a static ARP route in the forwarding plane; and
  - at the switch, adding a ternary content-addressable memory (TCAM) rule to forward traffic to the allocated IP address of the communications device.

11. The method of claim 10, wherein in response to the communications device connecting to the network port of the switch, conducting the DHCP and ARP data traffic between the communications device and the gateway through the tunnel connection comprises:
- at the switch, receiving at least one ARP message from the communications device; and
- from the switch, forwarding the at least one ARP message to the gateway through the tunnel connection between the switch and the gateway.

12. A method for communications, the method comprising:
- at an access switch (AS) or a distribution switch (DS) of a network, establishing a Generic Routing Encapsulation (GRE) tunnel connection between the AS or the DS and a gateway of the network; and
- in response to a wired device connecting to a network port of the AS or the DS, conducting Dynamic Host Configuration Protocol (DHCP) and Address Resolution Protocol (ARP) traffic between the wired device and the gateway through the GRE tunnel connection between the AS or the DS and the gateway, wherein in response to the wired device connecting to the network port of the AS or the DS, conducting the DHCP and ARP traffic between the wired device and the gateway through the GRE tunnel connection between the AS or the DS and the gateway comprises:
  - at the AS or the DS, receiving a DHCP discover message from the wired device;
  - forwarding the DHCP discover message to the gateway through the tunnel connection between the AS or the DS and the gateway;
  - at the AS or the DS, receiving a DHCP offer message from the gateway in response to the DHCP discover message;
  - at the AS or the DS, forwarding the DHCP offer message to the wired device;
  - at the AS or the DS, receiving a DHCP request message from the wired device;
  - forwarding the DHCP request message to the gateway through the tunnel connection between the AS or the DS and the gateway;
  - at the AS or the DS, receiving a DHCP acknowledgement (ACK) message from the gateway in response to the DHCP request message;
  - at the AS or the DS, forwarding the DHCP ACK message to the wired device;
  - at the AS or the DS, adding ARP information to a central processing unit (CPU) as well as a forwarding plane;
  - at the AS or the DS, obtaining an allocated IP address of the wired device from a response from the gateway;
  - at the AS or the DS, adding a static ARP route in the forwarding plane; and
  - at the AS or the DS, adding a ternary content-addressable memory (TCAM) rule to forward traffic to the allocated IP address of the wired device.

* * * * *